US010309815B2

(12) United States Patent
Igarashi

(10) Patent No.: US 10,309,815 B2
(45) Date of Patent: Jun. 4, 2019

(54) THERMAL FLOW METER WITH REINFORCING PLATE AND METHOD OF MANUFACTURING THE SAME

(71) Applicant: SURPASS INDUSTRY CO., LTD., Saitama (JP)

(72) Inventor: Hiroki Igarashi, Saitama (JP)

(73) Assignee: SURPASS INDUSTRY CO., LTD., Saitama (JP)

( * ) Notice: Subject to any disclaimer, the term of this patent is extended or adjusted under 35 U.S.C. 154(b) by 58 days.

(21) Appl. No.: 15/048,512

(22) Filed: Feb. 19, 2016

(65) Prior Publication Data
US 2016/0245682 A1   Aug. 25, 2016

(30) Foreign Application Priority Data
Feb. 23, 2015   (JP) ................................. 2015-033220

(51) Int. Cl.
| | |
|---|---|
| *G01F 1/69* | (2006.01) |
| *B32B 37/12* | (2006.01) |
| *G01F 1/684* | (2006.01) |
| *G01F 15/14* | (2006.01) |
| *G01F 15/18* | (2006.01) |

(52) U.S. Cl.
CPC ............ *G01F 1/69* (2013.01); *B32B 37/1207* (2013.01); *G01F 1/6847* (2013.01); *G01F 15/14* (2013.01); *G01F 15/18* (2013.01); *B32B 2315/08* (2013.01); *B32B 2457/00* (2013.01)

(58) Field of Classification Search
CPC .............................. G01F 15/18; G01F 1/6847

USPC ....................................................... 73/204.25
See application file for complete search history.

(56) References Cited

U.S. PATENT DOCUMENTS

| | | | | |
|---|---|---|---|---|
| 3,992,043 | A | * | 11/1976 | Whitley ................ F16L 19/061 285/328 |
| 5,154,453 | A | | 10/1992 | Nishio |
| 5,516,159 | A | | 5/1996 | Hirakawa et al. |

(Continued)

FOREIGN PATENT DOCUMENTS

| | | |
|---|---|---|
| JP | H102117494 U | 9/1990 |
| JP | S60081374 U | 9/1990 |

(Continued)

OTHER PUBLICATIONS

Extended European Search Report dated Jul. 20, 2016 from corresponding European Patent Application No. 16155925.7, 8 pages.

(Continued)

*Primary Examiner* — Nathaniel T Woodward
(74) *Attorney, Agent, or Firm* — MH2 Technology Law Group, LLP

(57) ABSTRACT

Provided is a thermal flow meter including a measurement tube made of resin having an inlet and an outlet, and an internal flow passage extending along an axis, a sensor substrate having a heating resistance wire and temperature detecting resistance wires formed on a detection surface along the axis, and a reinforcing plate. The sensor substrate is bonded to the measurement tube along the axis with an adhesive, and the reinforcing plate is bonded to the measurement tube along the axis with the adhesive with the internal flow passage interposed between the sensor substrate and the reinforcing plate.

12 Claims, 9 Drawing Sheets

(56) References Cited

U.S. PATENT DOCUMENTS

| | | | |
|---|---|---|---|
| 6,813,944 B2* | 11/2004 | Mayer | G01F 1/6845 73/204.26 |
| 2003/0049877 A1 | 3/2003 | Mayer et al. | |
| 2003/0107467 A1* | 6/2003 | Bonne | G01F 1/6845 338/25 |
| 2004/0261522 A1* | 12/2004 | Dykas | G01F 1/6847 73/273 |
| 2005/0022594 A1* | 2/2005 | Padmanabhan | G01F 1/684 73/204.26 |
| 2007/0044554 A1 | 3/2007 | Higashi et al. | |
| 2008/0010821 A1 | 1/2008 | Padmanabhan et al. | |
| 2008/0092644 A1 | 4/2008 | Hasebe | |
| 2009/0249869 A1 | 10/2009 | Meier et al. | |
| 2011/0198843 A1 | 8/2011 | Ikenoya et al. | |
| 2012/0060599 A1 | 3/2012 | Morino et al. | |
| 2013/0272734 A1* | 10/2013 | Zollner | G03G 15/0824 399/57 |
| 2014/0311912 A1 | 10/2014 | Shih et al. | |
| 2014/0360261 A1 | 12/2014 | Morino et al. | |
| 2017/0328752 A1 | 11/2017 | Morino et al. | |

FOREIGN PATENT DOCUMENTS

| | | |
|---|---|---|
| JP | 2003532099 A | 10/2003 |
| JP | 2006-010322 A | 1/2006 |
| JP | 2006519994 A | 8/2006 |
| JP | 2008511836 A | 4/2008 |
| JP | 2008101965 A | 5/2008 |
| JP | 2011169410 A | 9/2011 |
| JP | 2012058075 A | 3/2012 |
| WO | 2014176250 A1 | 10/2014 |

OTHER PUBLICATIONS

Extended European Search Report dated Jul. 21, 2016 from related European Application No. 16155920.8, 10 pages.
Igarashi, "Thermal Flow Meter and Method of Manufacturing the Same," U.S. Appl. No. 15/048,615, filed Feb. 19, 2016.
Japanese Office Action dated Aug. 28, 2018 in corresponding JP Application No. 2015-033220, 9 pages.
Japanese Office Action dated Aug. 28, 2018 in corresponding JP Application No. 2015-033221, 6 pages.

* cited by examiner

FIG. 2
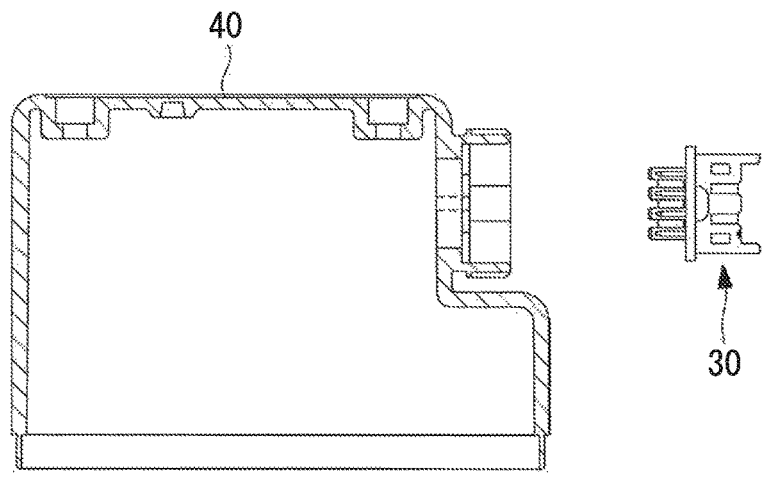
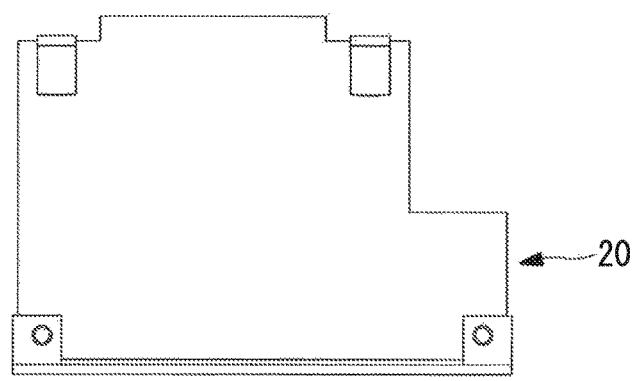
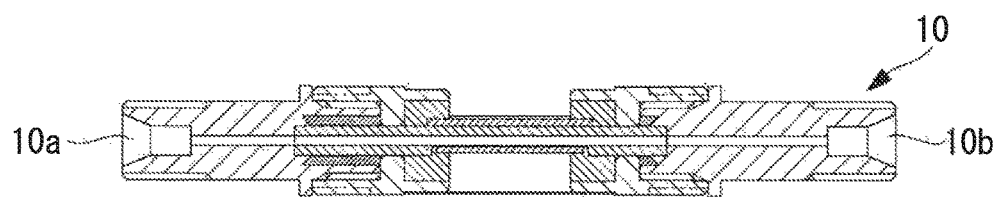
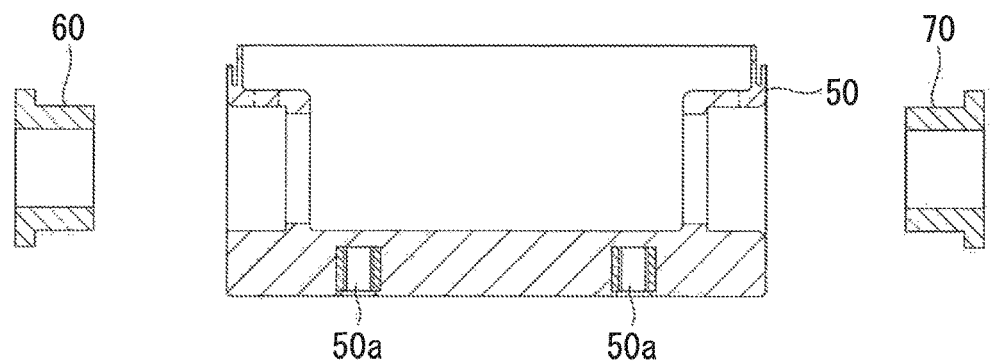

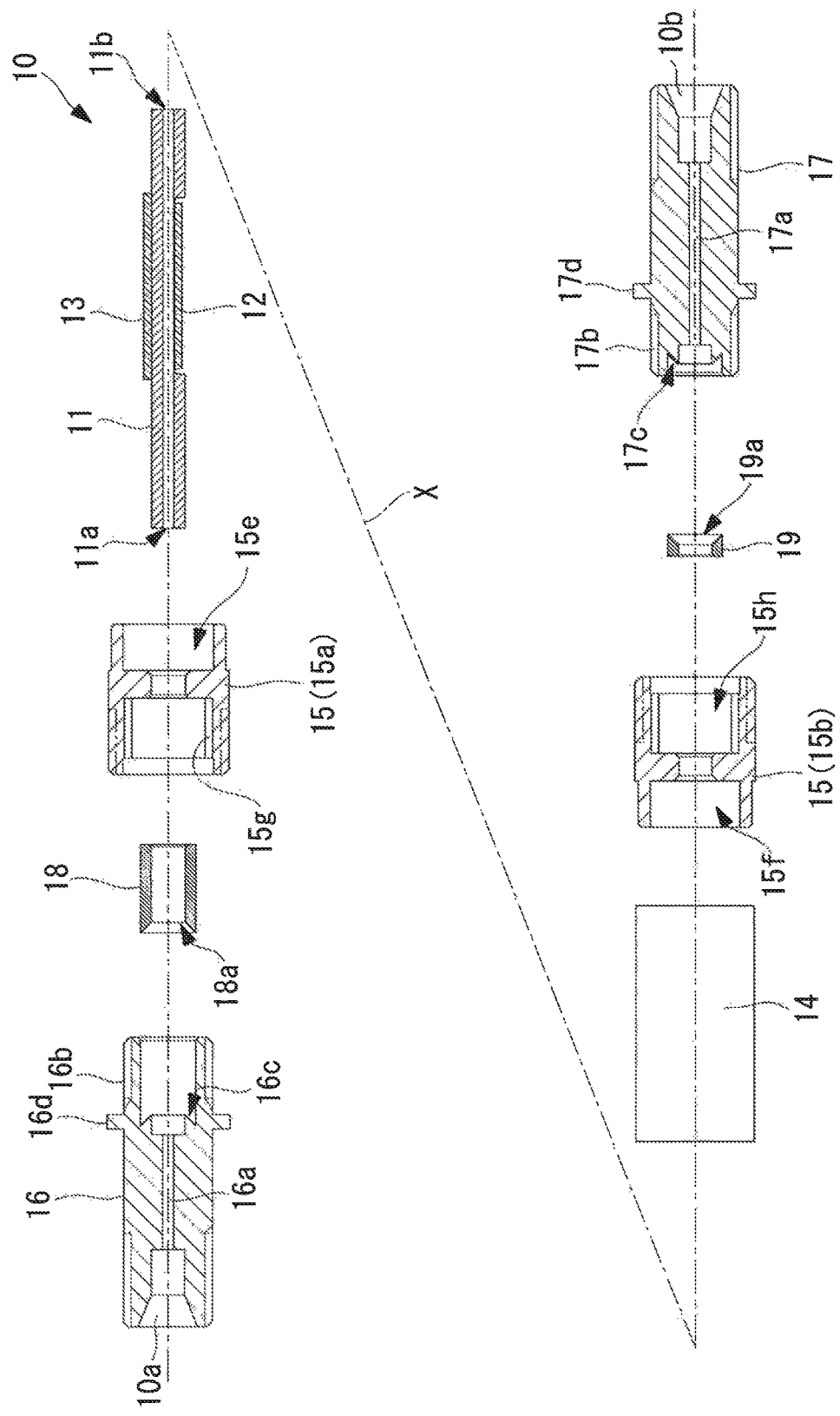

THERMAL FLOW METER WITH REINFORCING PLATE AND METHOD OF MANUFACTURING THE SAME

CROSS-REFERENCE TO RELATED APPLICATIONS

This application is based on Japanese Patent Application No. 2015-033220, the contents of which are incorporated herein by reference in its entirety.

TECHNICAL FIELD

The present disclosure relates to a thermal flow meter and a method of manufacturing the same.

BACKGROUND ART

Thermal flow meters are known in the art that control the temperature of liquid flowing through the flow passage to measure a flow rate based on a difference between temperatures of the liquid upstream and downstream of the temperature control part (refer to Japanese Unexamined Patent Application, Publication No. 2006-10322, for example).

Japanese Unexamined Patent Application, Publication No. 2006-10322 discloses a thermal flow meter with a flow passage a wetted portion of which is entirely formed of glass that is obtained by forming a rectangular groove on a glass substrate and bonding another glass substrate with a heat transfer means and a temperature detecting means to the groove side of the earlier glass substrate.

SUMMARY

Technical Problem

The flow passage a wetted portion of which is entirely formed of glass is unfavorable in that it has poor corrosion resistance to alkaline liquids because silicon dioxide, the main component of glass, neutralizes with alkaline liquids. Accordingly, a tubular flow passage formed of a resin material with high corrosion resistance to alkaline liquids is preferably used for measuring a flow rate of an alkaline liquid.

The tubular flow passage formed of a resin material is easily deformed by heat, and thus a flow rate might not be detected correctly due to thermal deformation caused to the tubular flow passage during manufacture or use.

The present disclosure has been made in view of the circumstances, and aims to provide a thermal flow meter that can maintain the measurement accuracy even if heated during manufacture or use, while improving the corrosion resistance to alkaline liquids, and also a method of manufacturing the thermal flow meter.

Solution to Problem

In order to solve the foregoing problem, the following solutions have been adopted in the present disclosure.

A thermal flow meter according to an aspect of the present disclosure includes a measurement tube made of resin including an inlet through which liquid enters and an outlet through which the liquid flowing from the inlet exits, and having an internal flow passage extending along an axis, a temperature detecting substrate having a heating resistance element and a temperature detecting resistance element formed on a detection surface thereof along the axis, and a reinforcing plate, and in the thermal flow meter, the detection surface of the temperature detecting substrate is bonded with an adhesive to the measurement tube along the axis, and the reinforcing plate is bonded with the adhesive to the measurement tube along the axis with the internal flow passage interposed between the reinforcing plate and the temperature detecting substrate.

In a thermal flow meter according to an aspect of the present disclosure, the detection surface of the temperature detecting substrate and the reinforcing plate are bonded to the measurement tube with the adhesive along the axis with the internal flow passage of the measurement tube interposed between the temperature detecting substrate and the reinforcing plate. If the measurement tube of resin is deflected as the thermal flow meter is heated during manufacture, the heating resistance element and the temperature detecting resistance element of the temperature detecting substrate would not be at appropriate positions of the measurement tube, thereby degrading the measurement accuracy of the thermal flow meter. Also, if the measurement tube of resin is deflected as the thermal flow meter is heated during use, the heating resistance element and the temperature detecting resistance element of the temperature detecting substrate would not be at the appropriate positions of the measurement tube, thereby degrading the measurement accuracy of the thermal flow meter.

According to a thermal flow meter in an aspect of the present disclosure, because the temperature detecting substrate and the reinforcing plate are arranged along the axis with the internal flow passage of the measurement tube interposed therebetween, when they are heated, similar amount of thermal stresses occur at the part of the measurement tube bonded to the temperature detecting substrate and that bonded to the reinforcing plate. This suppresses the bias in magnitude of the thermal stress that is caused to the measurement tube by heat, among the both sides of the measurement tube across the internal flow passage. As a result, the configuration suppresses the deflection of the measurement tube extending along the axis, away from the axis as compared with the case where only the temperature detecting substrate is bonded to the measurement tube.

As a result, there is provided the thermal flow meter that can maintain the measurement accuracy even if heated during manufacture or use, while improving the corrosion resistance to alkaline liquids.

A thermal flow meter according to an aspect or the present disclosure may be configured such that the measurement tube has on an outer circumferential surface thereof a first flat surface on which the detection surface of the temperature detecting substrate is oppositely positioned, and a second flat surface on which a face of the reinforcing plate is oppositely positioned with the internal flow passage interposed between the first flat surface and the second flat surface, and the first flat surface and the detection surface of the temperature detecting substrate are bonded together with the adhesive, and the second flat surface and the face of the reinforcing plate are bonded together with the adhesive.

In the thermal flow meter with the configuration, the measurement tube has the first flat surface to which the temperature detecting substrate is bonded and the second flat surface to which the reinforcing plate is bonded, with the internal flow passage of the measurement tube interposed therebetween. This can enhance the adhesiveness of the temperature detecting substrate and the reinforcing plate to the measurement tube while reducing the amount of the adhesive required for the adhesion.

In a thermal flow meter according to an aspect of the present disclosure, a first length of the temperature detecting substrate along the axis may be equal to or shorter than a second length of the reinforcing plate along the axis.

This more reliably suppresses the bias in magnitude of the thermal stress that is caused to the measurement tube by heat when the measurement tube is heated, among the both sides of the measurement tube across the internal flow passage.

In a thermal flow meter according to an aspect of the present disclosure, a first distance from the detection surface of the temperature detecting substrate to an inner circumferential surface of the internal flow passage may be shorter than a second distance from the face of the reinforcing plate to the inner circumferential surface of the internal flow passage.

This can enhance the property of the heating resistance element to heat the liquid inside the internal flow passage and the property of the temperature detecting resistance element to detect the temperature of the liquid.

In a thermal flow meter according to an aspect of the present disclosure, the temperature detecting substrate and the reinforcing plate may be made of glass.

Thus, the temperature detecting substrate and the reinforcing plate are used that are made of glass to have higher strength and less probability of deformation by heat than, the measurement tube of resin. This suppresses the deflection of the measurement tube caused when the temperature detecting substrate and the reinforcing plate are bonded to the measurement tube or during use.

A thermal flow meter according to an aspect of the present disclosure may be configured to further include an inlet-side body which has inside a first connection flow passage and into which the inlet of the measurement tube is inserted, an outlet-side body which has inside a second connection flow passage and into which the outlet of the measurement tube is inserted, a cylindrical inlet-side nut fitted along an outer circumferential surface of the measurement tube to be closer to the outlet than the inlet-side body, one inlet-side nut having on an inner circumferential surface thereof internal threads fastened to external threads formed on an outer circumferential surface of the inlet-side body, a cylindrical outlet-side nut fitted along the outer circumferential surface of the measurement tube to be closer to the inlet than the outlet-side body, the outlet-side nut having on an inner circumferential surface thereof internal, threads fastened to external threads formed on an outer circumferential surface of the outlet-side body, an inlet-side ferrule of resin formed in a cylindrical shape and fitted between the outer circumferential surface of the measurement tube and an inner circumferential surface of an end portion of the inlet-side body facing the outlet, the inlet-side ferrule being deformed to form a seal area as the inlet-side nut is fastened to the inlet-side body, and an outlet-side ferrule of resin formed in a cylindrical shape and fitted between the outer circumferential surface of the measurement tube and an inner circumferential surface of an end portion of the circlet-side body facing the inlet, the outlet-side ferrule being deformed to form a seal area as the outlet-side nut is fastened to the outlet-side body.

With the configuration, the inlet of the measurement tube is inserted into the inlet-side body and connected to the first connection, flow passage formed inside the inlet-side body. Similarly, the outlet of the measurement tube is inserted into the outlet-side body and connected to the second connection flow passage formed inside the outlet-side body.

When the external threads formed on the outer circumferential surface of the inlet-side body are fastened to the internal threads formed on the inner circumferential surface of the inlet-side nut, the cylindrical inlet-side ferrule that is fitted around the outer circumferential surface of the measurement tube is deformed to form the seal area. Similarly, when the external threads formed on the outer circumferential surface of the outlet-side body are fastened to the internal threads formed on the inner circumferential surface of the outlet-side nut, the cylindrical outlet-side ferrule that is fitted around the outer circumferential surface of the measurement tube is deformed to form the seal area.

The formation of the seal area on the inlet side of the measurement tube prevents the liquid from flowing out through the location of connection of the internal flow passage of the measurement tube with the first connection flow passage of the inlet-side body. Similarly, the formation of the seal area on the outlet side of the measurement tube prevents the liquid from flowing out through the location of connection of the internal flow passage of the measurement tube with the second connection flow passage of the outlet-side body.

In the configuration, it may be such that an end portion of the inlet-side nut facing the cutlet is provided with a first recess into which each of an end portion of the temperature detecting substrate facing the inlet and an end portion of the reinforcing plate facing the inlet is inserted, that the end portion of the temperature detecting substrate facing the inlet and the end portion of the reinforcing plate facing the inlet are fixed to the inlet-side nut by a filler charged in the first recess, that an end portion of the outlet-side nut facing the inlet is provided with a second recess into which each of an end portion of the temperature detecting substrate facing the outlet and an end portion of the reinforcing plate facing the outlet is inserted, and that the end portion of the temperature detecting substrate facing the outlet and the end portion of the reinforcing plate facing the outlet are fixed to the outlet-side nut by a filler charged in the second recess.

With this configuration, the end portions of the temperature detecting substrate and the reinforcing plate facing the inlet are fixed, by the filler, inside the first recess of the inlet-side nut, and the end portions of the temperature detecting substrate and the reinforcing plate facing the outlet are fixed, by the filler, inside the second recess of the outlet-side nut. This can securely fix the temperature detecting substrate and the reinforcing plate to the measurement tube while fixing the measurement tube to each of the inlet-side nut and the outlet-side nut.

In a thermal flow meter in accordance with an aspect of the present disclosure, the adhesive may be configured to be a thermosetting adhesive.

When a sensor unit formed of a glass substrate with a heat transfer means and a temperature detecting means is bonded to a tubular flow passage of a resin material, a thermosetting adhesive is preferably used for maintaining the adhesiveness of the sensor unit with the flow passage even if subjected to high temperatures during use. The thermosetting adhesive, however, has the property of being solidified by heat, and thus, the sensor unit and the tubular flow passage need to be heated for being bonded to each other. If the tubular flow passage of resin is deflected during the heating, the sensor unit cannot be bonded to the tubular flow passage appropriately.

According to the thermal flow meter with the configuration, the temperature detecting substrate and the reinforcing plate are arranged along the axis with the internal flow passage of the measurement tube interposed therebetween, and thus when they are heated together with the thermosetting adhesive during manufacture, similar amount of thermal stresses occur at the part of the measurement tube bonded to the temperature detecting substrate and that bonded to the reinforcing plate. This suppresses the bias in magnitude of the thermal stress that is caused to the measurement tube by heat, among the both sides of the measurement tube across the internal flow passage. As a result, the configuration suppresses the deflection of the measurement tube extending along the axis, away from, the axis as compared with the case where only the temperature detecting substrate is bonded to the measurement tube.

A method of manufacturing a thermal flow meter according to an aspect of the present disclosure is a method of manufacturing a thermal flow meter including a measurement tube made of resin including an inlet through which liquid enters and an outlet through which the liquid flowing from the inlet exits, and having an internal flow passage extending along an axis, a temperature detecting substrate having a heating resistance element and a temperature detecting resistance element formed on a detection surface along the axis, and a reinforcing plate, the method including the steps of arranging the temperature detecting substrate such that the detection surface comes into contact with the measurement tube via a thermosetting adhesive along the axis, arranging the reinforcing plate to come into contact with the measurement tube via the thermosetting adhesive along the axis with the internal flow passage interposed between she temperature detecting substrate and the reinforcing plate, and heating the measurement tube, the temperature detecting substrate, and the reinforcing plate to solidify the thermosetting adhesive.

According to a method for manufacturing a thermal flow meter in an aspect of the present disclosure, a thermal flow meter is formed in which the detection surface of the temperature detecting substrate and the reinforcing plate are bonded to the measurement tube along the axis with the thermosetting adhesive such that the internal flow passage of the measurement tube is interposed between the temperature detecting substrate and the reinforcing plate. Because the thermosetting adhesive has the property of being solidified by heat, when the temperature detecting substrate and the reinforcing plate are bonded to the measurement tube, they need to be heated. If the tubular flow passage of resin is deflected during the heating process, the heating resistance element and the temperature detecting resistance element of the temperature detecting substrate would not be at the appropriate positions of the measurement tube, thereby degrading the measurement accuracy of the thermal flow meter.

According to a method for manufacturing a thermal flow meter in an aspect of the present disclosure, the temperature detecting substrate and the reinforcing plate are each arranged to be in contact with the measurement tube along the axis via the thermosetting adhesive with the internal flow passage of the measurement tube interposed between the temperature detecting substrate and the reinforcing plate, and then they are heated to solidify the thermosetting adhesive. In the process of heating the measurement tube, the temperature detecting substrate, and the reinforcing plate, similar amount of thermal stresses occur at the part of the measurement tube bonded to the temperature detecting substrate and that bonded to the reinforcing plate. This suppresses the bias in magnitude of the thermal stress that is caused to the measurement tube by heat, among the both sides of the measurement tube across the internal flow passage. As a result, this method suppresses the deflection of the measurement tube extending along the axis, away from the axis as compared with the case where only the temperature detecting substrate is bonded to the measurement tube.

Thus, there is provided the method of manufacturing the thermal flow meter that can maintain the measurement accuracy even if heated during manufacture or use, while improving the corrosion resistance to alkaline liquids.

Advantageous Effects

The present disclosure can provide a thermal flow meter that can maintain the measurement accuracy even if heated during manufacture or use, while improving the corrosion resistance to alkaline liquids, and also a method of manufacturing the thermal flow meter.

BRIEF DESCRIPTION OF DRAWINGS

FIG. 2 is an exploded assembly view of the thermal flow meter shown in FIG. 1;

FIG. 4 is an exploded assembly view of the sensor unit shown in FIG. 3;

DESCRIPTION OF EMBODIMENTS

First Embodiment

Hereinafter, a thermal flow meter 100 according to a first embodiment of the present disclosure will be described with reference to the drawings.

The thermal flow meter 200 of the embodiment heats liquid flowing through an internal flow passage and detects a temperature of the heated liquid to thereby measure a flow rate thereof. The thermal flow meter 100 of the embodiment is suitable for measuring a very small amount of flow rate in the range of from 0.1 cc/min to 30 cc/min, for example.

Figure 1:
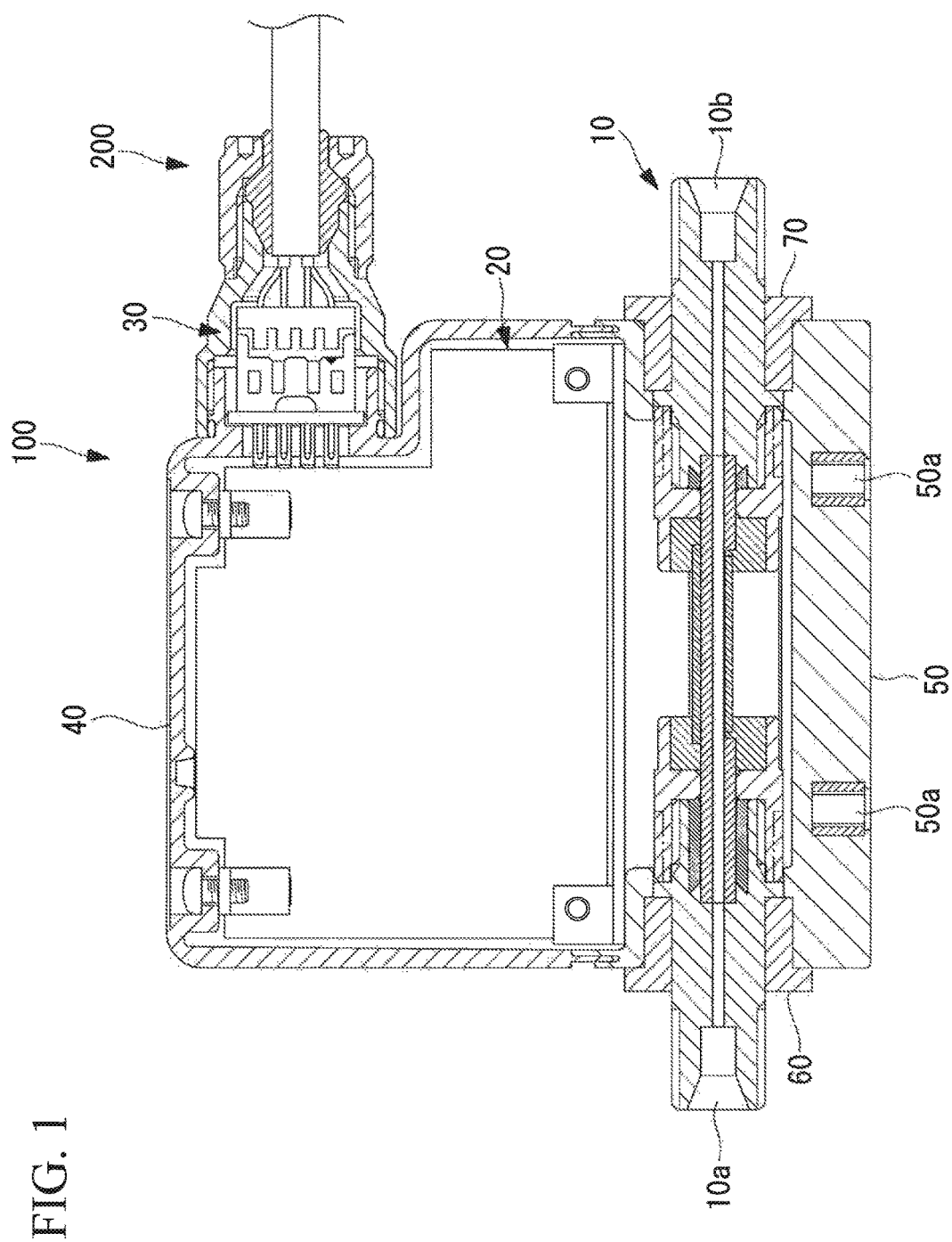
FIG. 1 is a vertical cross-sectional view of a thermal flow meter according to a first embodiment.

As shown in FIGS. 1 and 2, the thermal flow meter 100 of the embodiment includes a sensor unit 10, a control substrate 20, a relay substrate 30, an upper case 40, and a bottom case 50.

Figure 3:
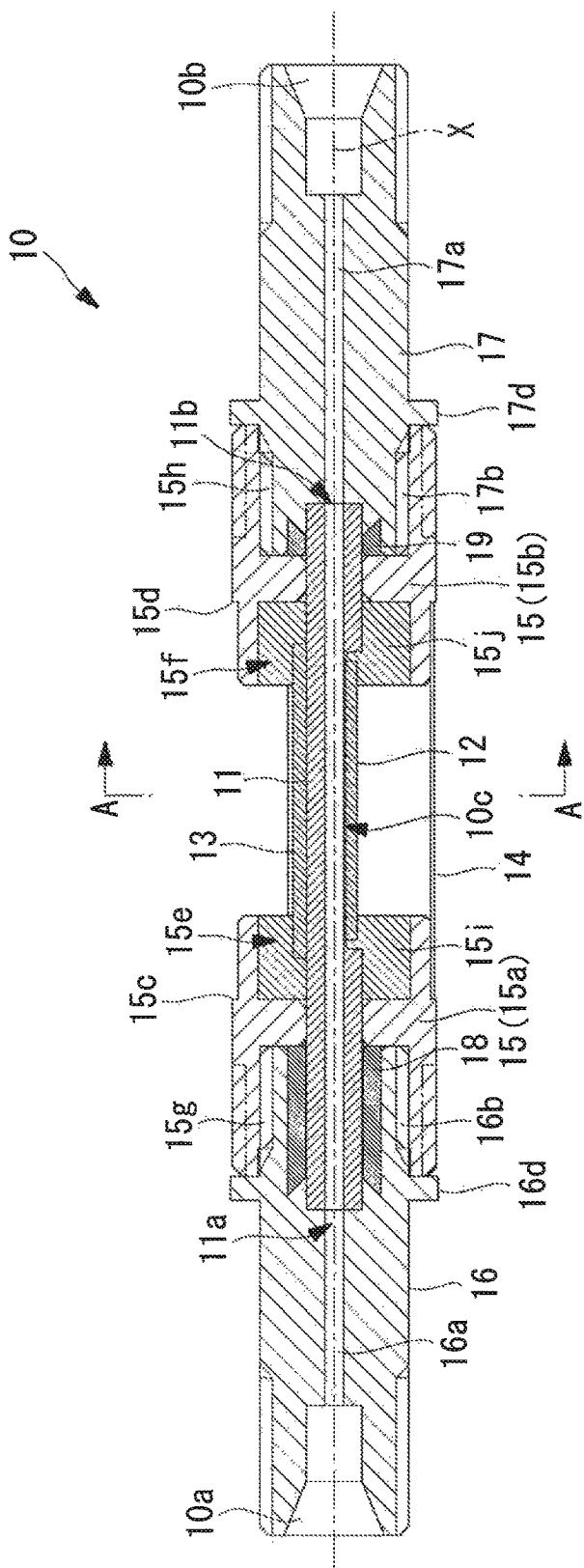
FIG. 3 is a vertical cross-sectional view illustrating a sensor unit shown in FIG. 2.

As shown in FIG. 3, the sensor unit 10 lets incoming liquid from an inlet 10a connected to external piping (not shown) flow out through an outlet 10b connected to external piping (not shown), and at the same time, measures a flow rate of the liquid flowing through an internal flow passage 10c. The sensor unit 10 does not directly calculate the flow rate of the liquid, but detects the temperature of the liquid heated by a heating resistance wire 12a (a heating resistance element) that will be described later with temperature detecting resistance wires 12b and 12c (temperature detecting resistance elements), and transmits a temperature detection signal indicating the detected temperature to the control substrate 20 through a signal wire (not shown).

The sensor unit 10 will be described later in detail.

The control substrate 20 transmits a voltage signal to the heating resistance wire 12a of the sensor unit 10 to heat it, and also calculates the flow rate of the liquid based on the temperature transmitted from the temperature detecting resistance wires 12b and 12c.

The relay substrate 30 that relays various signals transmitted and received between the control substrate 20 and an external device (not shown). A cable 200 for transmitting and receiving the various signals to and from the external device (not shown) is connected to the relay substrate 30.

The upper case 40 serves as a housing for an upper portion of the thermal flow meter 100, and accommodates the control substrate 20 inside.

The bottom case 50 serves as a housing for a lower portion of the thermal flow meter 100, and accommodate the sensor unit 10 inside. With the sensor unit 10 inserted in the bottom case 50, a stopper 60 is inserted between the bottom case 50 and the sensor unit 10 from the inlet 10a side of the sensor unit 10.

Similarly, with the sensor unit 10 inserted in the bottom case 50, a stopper 70 is inserted between the bottom case 50 and the sensor unit 10 from the outlet 10b side of the sensor unit 10. The sensor unit 10 becomes fixed to the bottom case 50 by means of the stoppers 60 and 70.

The bottom case 50 has fastening holes 50a on its bottom surface and is fixed to an installation surface (not shown) by fastening bolts (not shown) that are inserted from below the installation surface.

Next, the sensor unit 10 will be described in detail with reference to FIGS. 3 to 8.

As shown in FIGS. 3 and 4, the sensor unit 10 has a measurement tube 11, a sensor substrate 12 (temperature detecting substrate), a reinforcing plate 13, a guide 14, a nut 15, an inlet-side body 16, an outlet-side body 17, an inlet-side ferrule 18, and an outlet-side ferrule 19.

Figure 6:
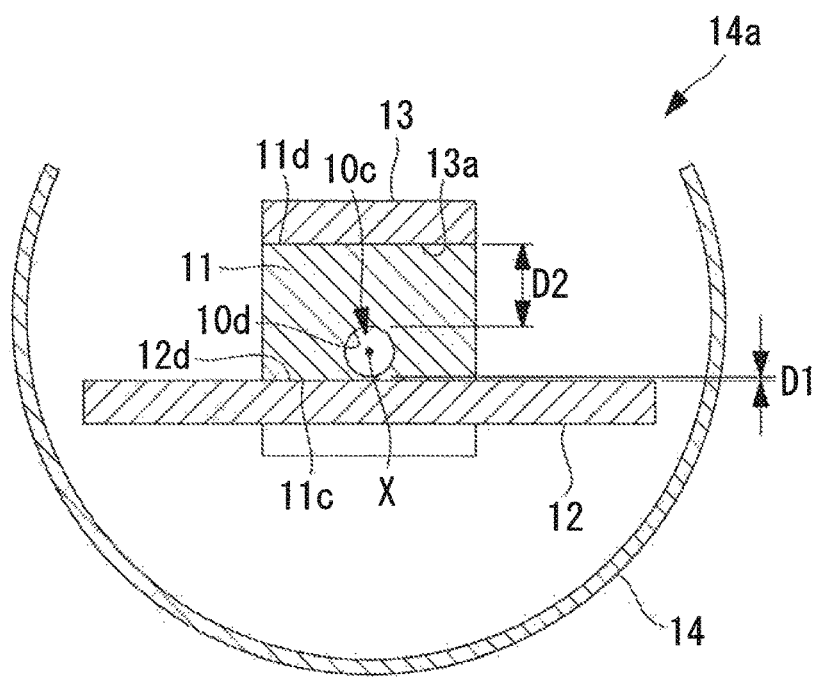
FIG. 6 is a cross-sectional view of the sensor unit shown in FIG. 3 taken along the line A-A.

The measurement tube 11 is a tube that includes an inlet 11a through which liquid enters and an outlet 11b through which the liquid front the inlet 11a exits. As shown in FIG. 6 (a cross-sectional view taken along the line A-A in FIG. 3), the measurement, tube 11 has formed therein the internal flow passage 10c that extends along an axis X and has a circular cross section. The measurement tube 11 is formed of a resin material with high corrosion resistance to alkaline liquids (e.g., PTFE: polytetrafluoroethylene).

Figure 8:
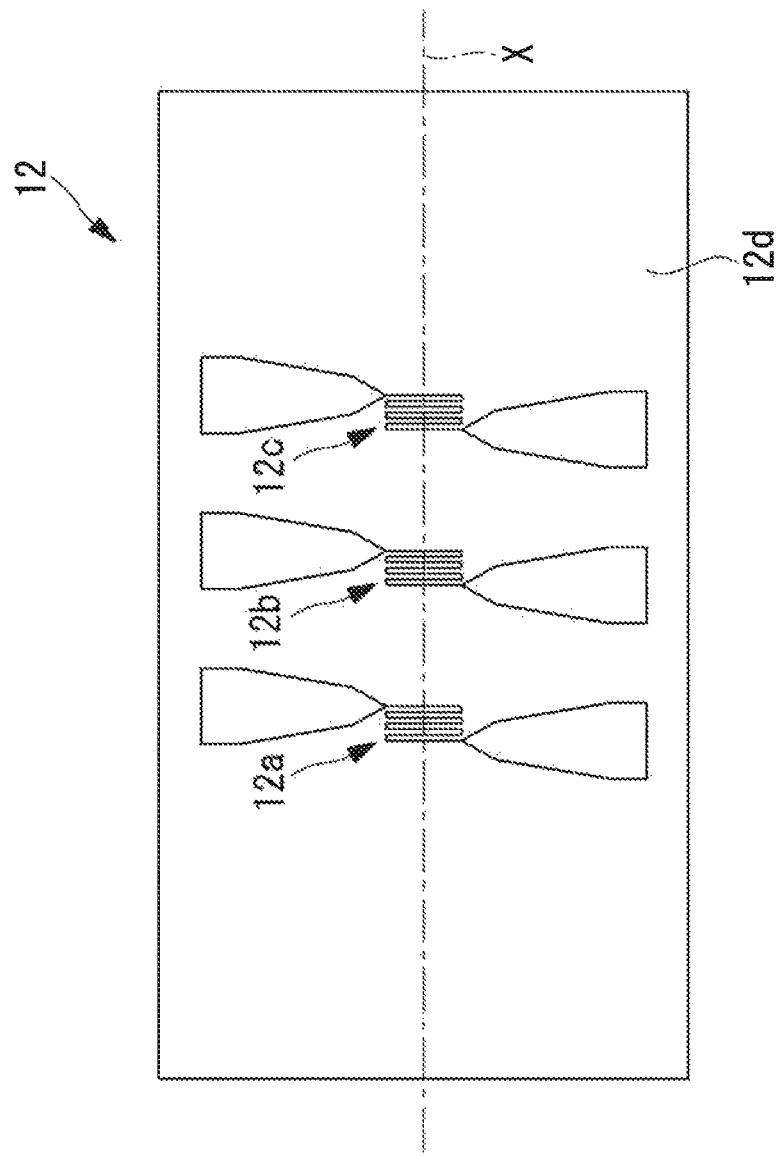
FIG. 8 is a plan view of a detection surface of the sensor substrate shown in FIG. 5B.

As shown in FIG. 8, the sensor substrate 12 is a glass substrate (e.g., made of quarts glass, which has a high silicon dioxide content) with the heating resistance wire 12a (the heating resistance element), the temperature detecting resistance wire 12b (the temperature detecting resistance element), and the temperature detecting resistance wire 12c (the temperature detecting resistance element) formed on a detection surface 12d along the axis X.

The heating resistance wire 12a, the temperature detecting resistance wire 12b, and the temperature detecting resistance wire 12c are each formed of a metal film, such as of platinum, evaporated onto the glass substrate.

The liquid flowing in the measurement tube 11 flows along the axis X from, the left to the right in FIG. 8.

Accordingly, when the heating resistance wire 12a is heated momentarily, the heated liquid flows along the axis X to the position of the temperature detecting resistance wire 12b and then to the temperature detecting resistance wire 12c.

The control substrate 20, therefore, can calculate the flow speed of the liquid flowing in the measurement tube 11 from the timing at which the heating resistance wire 12a was momentarily heated and the timings at which the temperature detecting resistance wire 12b and the temperature detecting resistance wire 12c subsequently detect the temperature of the heated liquid. Also, the control substrate 20 can calculate the flow rate of the liquid from the obtained flow speed and the cross-sectional area of the measurement tube 11.

Although the temperature detecting resistance wires 12b and 12c are arranged downstream of the heating resistance wire 12a in the liquid flowing direction in FIG. 8, they may be arranged otherwise.

For example, the temperature detecting resistance wire 12b may be arranged upstream of the heating resistance wire 12a in the liquid flowing direction, and the temperature detecting resistance wire 12c may be arranged downstream of the heating resistance wire 12a in the liquid flowing direction. The temperature distribution to be created by the heating resistance wire 12a depends on the flowing speed of the liquid, and the more the flowing speed increases, the more heat is conveyed downstream to raise the downstream temperature. The control substrate 20 can calculate the flow rate of the liquid from a difference between temperatures detected by the temperature detecting resistance wires 12b and 12c, and a cross-sectional area of the measurement tube 11.

The reinforcing plate 13 is a plate-shaped member that suppresses the deflection of measurement tube 11 away from the axis X during bonding of the sensor substrate 12 to the measurement tube 11 with an adhesive. The reinforcing plate 13 is made of glass (e.g., quartz glass, which has a high silicon dioxide content) similarly to the sensor substrate 12.

As shown in FIG. 6 (the cross-sectional view taken along the line A-A in FIG. 3), the measurement tube 11 has a rectangular cross section in a plane orthogonal to the axis X, at points where the sensor substrate 12 and the reinforcing plate 13 are bonded to the measurement tube 11. An outer circumferential surface of the measurement tube 11 has a flat surface lie for the sensor substrate (a first flat surface) where the detection surface 12d of the sensor substrate 12 is arranged as opposed to the measurement tube. Also, the outer, circumferential surface of the measurement tube 11 has a flat surface 11d for the reinforcing plate (a second flat surface) where a bonding surface 13a of the reinforcing plate 13 is arranged as opposed to the measurement tube.

Figure 7:
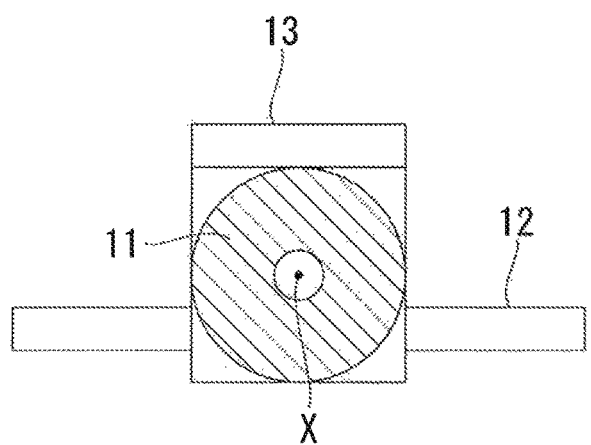
FIG. 7 is a cross-sectional view of the measurement tube, the sensor substrate, and the reinforcing plate shown in FIG. 5B taken along the line B-B.

On the other hand, as shown in FIG. 7 (a cross-sectional view taken along the line B-B in FIG. 5B), the measurement tube 11 has a circular cross section in a plane orthogonal to the axis X, at points where the sensor substrate 12 and the reinforcing plate 13 are not bonded to the measurement tube 11.

Figure 5A:
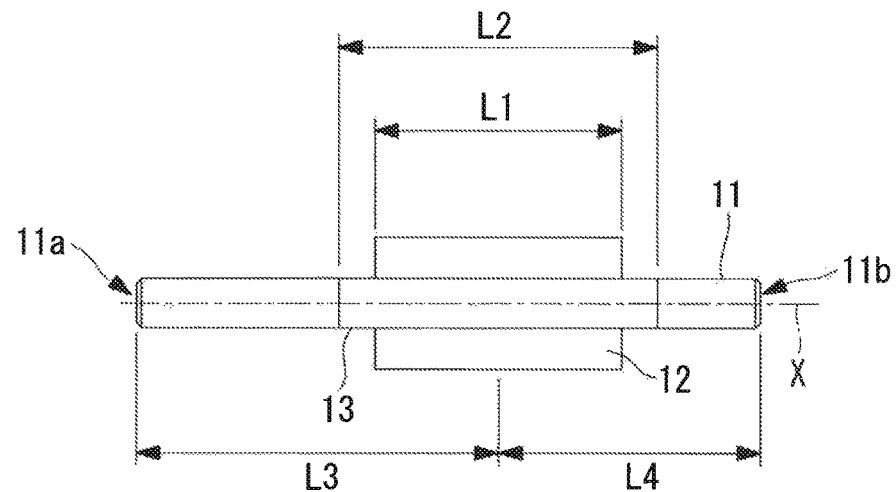
FIG. 5A illustrates a plan view of a measurement tube, a sensor substrate, and a reinforcing plate shown in FIG. 3.
Figure 5B:
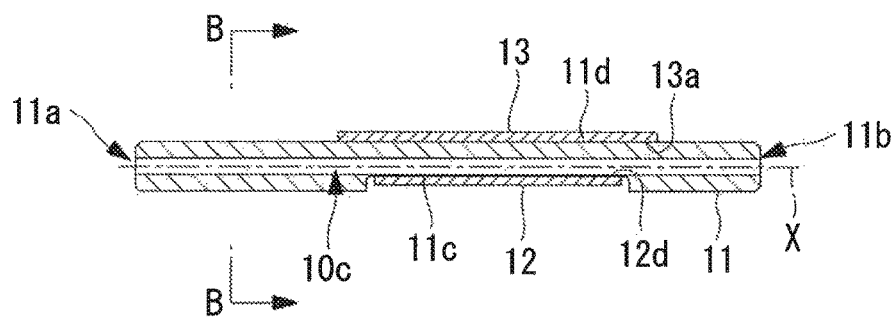
FIG. 5B illustrates a vertical cross-sectional view of a measurement tube, a sensor substrate, and a reinforcing plate shown in FIG. 3.
Figure 5C:
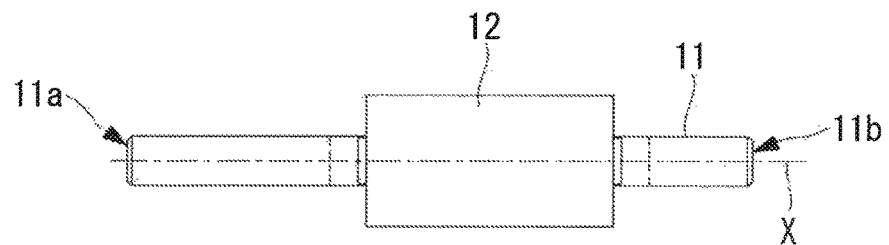
FIG. 5C illustrates a bottom view of a measurement tube, a sensor substrate, and a reinforcing plate shown in FIG. 3.

As shown in FIGS. 5 and 6, the flat surface 11c for the sensor substrate of the measurement tube 11 is arranged to be opposed to the detection surface 12d of the sensor substrate 12. The flat surface 11c for the sensor substance and the detection surface 12d are bonded together with an adhesive. Also, as shown in FIG. 6, the flat surface 11d for the reinforcing plate of the measurement tube 11 is arranged to be opposed to the bonding surface 13a of the reinforcing plate 13. The flat surface 11d for the reinforcing plate and the bonding surface 13a are bonded together with an adhesive.

Thus, the sensor substrate 12 is bonded to the measurement tube 11 along the axis X with the adhesive, and the reinforcing plate 13 is bonded to the measurement tube 11 along the axis X with the adhesive with the internal flow passage 10c interposed between the reinforcing plate 13 and the sensor substrate 12. As shown in FIGS. 5 and 6, the detection surface 12d of the sensor substrate 12 and the bonding surface 13a of the reinforcing plate 13 are arranged parallel to each other.

Here, examples of the adhesive may include epoxy resin-based adhesives, UV curable resin-based adhesives, thermosetting-resin-based adhesives (thermosetting adhesives), and low melting point glasses.

As shown in FIG. 5A, a length L1 of the sensor substrate 12 along the axis X (a first length) is shorter than a length L2 of the reinforcing plate 13 along the axis X (a second length). This is for the purpose of reinforcing, with the reinforcing plate 13, the entire region where the sensor substrate 12 is present along the axis X and the opposing location across the internal flow passage 10c. The length L1 and the length L2 may be the same. That is, the length L2 is required to be equal to or longer than the length L1.

As shown in FIG. 6, a distance D1 (a first distance) from the detection surface 12d of the sensor substrate 12 to an inner circumferential surface 10d of the internal flow passage 10c is made shorter than a distance D2 (a second distance) from the bonding surface 13a of the reinforcing plate 13 to the inner circumferential surface 10d of the internal flow passage 10c. This is for the purpose of improving thermal conductivity from the heating resistance wire 12a to the liquid while improving temperature detecting property of the temperature detecting resistance wire 12b and the temperature detecting resistance wire 12c, by reducing the distance D1 from the detection surface 12d of the sensor substrate 12 to the inner circumferential surface 10d of the internal flow-passage 10c.

As shown in FIG. 6, the guide 14 is a metal member (e.g., made of stainless steel) that has a circular cross section and is provided with an opening portion 14a at its top.

The guide 14 guides a pair of nuts 15 such that the nuts are coupled together. As shown in FIG. 3, the pair of nuts 15 are coupled together via the measurement tube 11, and the measurement tube 11 and the nuts 15 are fixed together by a filler 15i that is charged into a recess 15e (a first recess) and a filler 15j that is charged into a recess 15f (a second recess).

Accordingly, a space between the pair of nuts 15 in the direction of the axis X is fixed in the sensor unit 10 after manufacture shown in FIG. 3. On the other hand, the measurement tube 11 and the nuts 15 are not fixed together when the recesses 15e and 15f are not filled with the fillers 15i and 15j. With the measurement tube 11 and the nuts 15 not fixed together, the guide 14 is in contact at one end portion with a step portion 15c of the inlet-side nut 15a and at the other end portion with a step portion 15d of the outlet-side nut 15b to thereby maintain a constant distance between the pair of nuts 15.

Examples of the fillers 15i and 15j include those of epoxy resins, acrylic resins, and silicone resins.

The inlet-side body 16 receives the inlet 11a of the measurement tube 11 and has inside a connection flow passage 16a. (a first connection flow passage) that has a circular cross section, as shown in FIG. 3. The inlet-side body 16 has external threads 16b on an outer circumferential surface of its end portion facing the outlet 10b.

The outlet-side body 17 receives the outlet 11b of the measurement tube 11 and has inside a connection flow passage 17a (a second connection flow passage) that has a circular cross section, as shown in FIG. 3. The outlet-side body 17 has external threads 17b on an outer circumferential surface of its end portion facing the inlet 10a.

The inlet-side body 16 and the outlet-side body 17 are formed from a resin material with high corrosion resistance (e.g., PTFE: polytetrafluoroethylene).

The nuts 15 include the inlet-side nut 15a attached to the inlet-side body 16 and the outlet-side nut 15b attached to the outlet-side body 17.

As shown in FIG. 3, the inlet-side nut 15a is a cylindrical member fitted along the outer circumferential surface of the measurement tube 11 to be closer to the outlet 11b than the inlet-side body 16. The inlet-side nut 15a has internal threads 15g on an inner circumferential surface of its end portion facing the inlet 10a. Also, the outlet-side nut 15b is a cylindrical member fitted along the outer circumferential surface of the measurement tube 11 to be closer to the inlet 11a than the outlet-side body 17. The outlet-side nut 15b has internal threads 15h on an inner circumferential surface of its end portion facing the outlet 10b.

The inlet-side nut 15a is attached to the inlet-side body 16 as the internal threads 15g of the inlet-side nut 15a and the external threads 16b of the inlet-side body 16 are fastened together. Similarly, the outlet-side nut 15b is attached to the outlet-side body 17 as the internal threads 15h of the outlet-side nut 15b and the external threads 17b of the outlet-side body 17 are fastened together.

The inlet-side nut 15a has the recess 15e (the first recess) that is recessed toward the inlet 10a, at its end portion, facing the outlet 10b. As shown, in FIG. 3, an inlet 11a side end portion of the sensor substrate 12 and an inlet 11a side end portion of the reinforcing plate 13 are inserted in the recess 15e. Also, the recess 15e is filled with the filler 15i. The inlet 11a side end portion of the sensor substrate 12 and the inlet 11a side end portion of the reinforcing plate 13 are fixed to the inlet-side nut 15a by the filler 15i.

The outlet-side nut 15b has the recess 15f (the second recess) that is recessed toward the outlet 10b, at its end portion facing the inlet 10a. As shown in FIG. 3, an outlet 11b side end portion of the sensor substrate 12 and an outlet 11b side end portion of the reinforcing plate 13 are inserted in the recess 15f. Also, the recess 15f is filled with the filler 25j. The outlet 11b side end portion of the sensor substrate 12 and the outlet 11b side end portion of the reinforcing plate 13 are fixed to the outlet-side nut 15b by the filler 15j.

It is to be noted that although the fillers are only charged into the recesses 15e and 15f of the nuts 15 in the foregoing description, the sensor unit 10 may have other configurations. For example, the filler may be charged to fill up the entire region inside an inner circumference of the guide 14 in addition to the recesses 15e and 15f. In that case, the sensor substrate 12 and the reinforcing plate 13 are entirely fixed with the filler, and at the same time, the inlet-side nut 15a and the outlet-side nut 15b are fixed together by the filler.

The inlet-side ferrule 18 is a cylindrical resin member (e.g., formed of PTFE) that is inserted in between the outer circumferential surface of the measurement tube 11 and the inner circumferential surface of the outlet 10b side end portion of the inlet-side body 16.

As shown in FIG. 4, an inlet 10a side end portion of the inlet-side ferrule 18 has a tip portion 18a at which the distance between an inner circumferential surface and an outer circumferential surface of the tip portion 18a gradually decreases toward the inlet 10a. The tip portion 18a is inserted, into a groove portion 16c formed inside the inlet-side body is as it is inserted, into the inlet-side body 16.

The outlet-side ferrule 19 is a cylindrical resin member (e.g., formed of PTFE) that is inserted in between the outer circumferential surface of the measurement tube 11 and an inner circumferential surface of the inlet 10a side end portion of the outlet-side body 17.

As shown in FIG. 4, an outlet 10b side end portion of the outlet-side ferrule 19 has a tip portion 19a at which the distance between an inner circumferential surface, and an outer circumferential surface gradually decreases toward the outlet 10b. The tip portion 19a is inserted into a groove portion 17c formed inside the outlet-side body 17 as it is inserted into the outlet-side body 17.

As shown in FIG. 4, the groove portion 16c of the inlet-side body 16 and the groove portion 17c of the outlet-side body 17 are each formed to decrease in the groove width with the distance from the entrance of the groove to the bottom portion. The groove portion 16c and the tip portion 18a have the same length in the direction of the axis X, while the groove portion 16c is sharper than the tip portion 18a. Thus, in order to accommodate the tip portion 13a in the groove portion 16c without leaving any space, the tip portion 18a needs to be deformed to conform to the shape of the groove portion 16c.

Similarly, the groove portion 17c and the tip portion 19a have the same length in the direction of the axis while the groove portion 17c is sharper than the tip portion 19a. Thus, in order to accommodate the tip portion 19a in the groove portion 17c without leaving any space, the tip portion 19a needs to be deformed to conform to the shape of the groove portion 17c.

The sensor unit 10 in the thermal flow meter 100 of the embodiment is assembled by fastening the internal threads 15g of the inlet-side nut 15a to the external threads 16b of the inlet-side body 16 with the inlet 11a of the measurement tube 11 and the inlet-side ferrule 18 inserted in the outlet 10b side end portion of the inlet-side body 16, and fastening the internal threads 15h of the outlet-side nut 15b to the external threads 17b of the outlet-side body 17 with the outlet 11b of the measurement tube 11 and the outlet-side ferrule 19 inserted in the inlet 10a side end portion of the outlet-side body 17.

The tip portion 18a of the inlet-side ferrule 18 is forced into the groove portion 16c of the inlet-side body 16 as the internal threads 15g of the inlet-side nut 15a become fastened to the external threads 16b of the inlet-side body 16. Because the groove portion 16c is sharper than the tip portion 18a, the tip portion 18a is gradually deformed as it is forced into the groove portion 16c, and finally, deformed to be accommodated in the groove portion 16c without leaving any space.

The deformation of the tip portion 18a forms a seal area between the outer circumferential surface of the measurement tube 11 and the inner circumferential surface of the inlet-side body 16, which reliably shuts off liquid that flows out through a location of connection of the connection flow passage 16a with the internal, flow passage 10c so that the liquid never leaks to the outside. Moreover, the tip portion 18a of the inlet-side ferrule 18 is positioned in the vicinity of the location of connection of the connection flow passage 16a with the internal flow passage 10c, thereby reducing an amount of liquid that flows out through the connection location to be remained (dead volume).

The fastening of the internal threads 15g of the inlet-side nut 15a and the external threads 16b of the inlet-side body 16 is completed as an inlet 10a side end of the inlet-side nut 15a comes into contact with a projecting portion 16d of the inlet-side body 16. The amount of deformation of the tip portion 18a forced into the groove portion 16c can be kept appropriate by arranging the projecting portion 16d at an appropriate position.

The tip portion 19a of the outlet-side ferrule 19 is forced into the groove portion 17c of the out let-side body 17 as the internal threads 15h of the outlet-side out 15b become fastened to the external threads 17b of the outlet-side body 17. Because the groove portion 17c is sharper than the tip portion 19a, the tip portion 19a is gradually deformed as it is forced into the groove portion 17c, and finally, deformed to be accommodated in the groove portion 17c without leaving any space.

The deformation of the tip portion 19a forms a seal area, between the outer circumferential surface of the measurement tube 11 and the inner circumferential surface of the outlet-side body 17, which reliably shuts off liquid that flows out through a location of connection of the connection flow passage 17a (the second connection flow passage) with the internal flow passage 10c so that the liquid never leaks to the outside. Moreover, the tip portion 19a of the outlet-side ferrule 19 is positioned in the vicinity of the location of connection of the connection flow passage 17a with the internal flow passage 10c, thereby reducing an amount of liquid that flows out through the connection location to be remained (dead volume).

The fastening of the internal threads 15h of the outlet-side nut 15b and the external threads 17b of the outlet-side body 17 is completed as an outlet 10b side end of the outlet-side nut 15b comes into contact with a projecting portion 17d of the outlet-side body 17. The amount of deformation of the tip portion 19a forced into the groove portion 17c can be kept appropriate by arranging the projecting portion 17d at an appropriate position.

As shown in FIG. 5A, a distance L3 from the inlet 11a of the measurement tube 11 to the middle portion of the sensor substrate 12 in the direction of the axis X is longer than a distance L4 from the outlet lib of the measurement tube 11 to the middle portion of the sensor substrate 12 in the direction of the axis X.

This is for the purpose of increasing the distance L3 from the location of connection of the connection flow passage 16a with the inlet 11a of the measurement tube 11 to the middle portion of the sensor substrate 12 in the direction of the axis X. Even if turbulence is generated in the liquid flow at the connection flow passage 16a and the inlet 11a of the measurement tube 11, the liquid flow can be stabilized before it reaches the middle portion of the sensor substrate 12 by increasing the distance L3.

As shown in FIGS. 3 and 4, the length of the inlet-side ferrule 18 along the axis X is made longer than the length of the outlet-side ferrule 19 along the axis X as the distance L3 is made longer than the distance L4.

This is for the purpose of positioning the tip portion 18a of the inlet-side ferrule 18 in the vicinity of the location of connection of the connection flow passage 16a with the inlet 11a while positioning the tip portion 19a of the outlet-side ferrule 19 in the vicinity of the location of connection of the connection flow passage 17a with the outlet 11b.

Next, a method of manufacturing the thermal flow meter 100 of the embodiment will be described.

To begin with, a description will be given on a method for manufacturing the sensor unit 10 of the thermal flow meter 100.

First, the adhesive is applied to either one of the detection surface 12d of the sensor substrate 12 and the flat surface 11c for the sensor substrate of the measurement tube 11, and then, the sensor substrate 12 and the measurement tube 11 are arranged such that the detection surface 12d and the flat surface 11c for the sensor substrate are in contact with each other via the adhesive, as shown in FIG. 5B.

Second, the adhesive is applied to either one of the bonding surface 13a of the reinforcing plate 13 and the flat surface 11d for the reinforcing plate of the measurement tube 11, and then, the reinforcing plate 13 and the measurement tube 11 are arranged such that the bonding surface 13a and the flat surface 11c for the reinforcing plate are in contact with each other via the adhesive, as shown in FIG. 5B.

Third, the measurement tube 11 with the sensor substrate 12 and the reinforcing plate 13 bonded thereto is mounted to a jig (not shown) to solidify the adhesive. The solidification of the adhesive renders the sensor substrate 12 and the reinforcing plate 13 secured to the measurement tube 11.

Here, when using a thermosetting-resin-based adhesive as the adhesive, the thermosetting-resin-based adhesive is solidified by mounting the measurement tube 11 with the sensor substrate 12 and the reinforcing plate 13 bonded thereto to the jig (not shown) and heating them.

Fourth, the inlet 11a of the measurement tube 11 is inserted into the inlet-side nut 15a, the inlet-side ferrule 18, and the inlet-side body 16 in this order. Also, the outlet lib of the measurement tube 11 is inserted into the outlet-side nut 15b, the outlet-side ferrule 19, and the outlet-side body 17 in this order. Here, the inlet-side nut 15a is attached to the inlet 10a side end portion of the guide 14 and the outlet-side nut 15b is attached to the outlet 10b side end portion of the guide 14, so that the inlet-side nut 15a and the outlet-side nut 15b are retained as appropriate.

Fifth, the internal threads 15g of the inlet-side nut 15a are fitted around the external threads 16b of the inlet-side body 16, and fastened to the external threads 16b until the inlet 10a side end portion of the inlet-side nut 15a comes into contact with the projecting portion 16d. Also, the internal threads 15h of the outlet-side nut 15b are fitted around the external threads 17b of the outlet-side body 17, and fastened to the external threads 17b until the outlet 10b side end portion of the outlet-side nut 15b comes into contact with the projecting portion 17d. Here, the tip portion 18a of the inlet-side ferrule 18 and the tip portion 19a of the outlet-side ferrule 19 are each deformed to form the seal areas.

Sixth, the recess 15e at the outlet 10b side end portion of the inlet-side nut 15a is filled with the heated and softened filler 15i, which is then cooled down until the filler 15i solidifies. Similarly, the recess 15f at the inlet 10a side end portion of the outlet-side nut 15b is filled with the heated and softened filler 15j, which is then cooled down until the filler 15j solidifies.

The sensor unit 10 shown in FIG. 3 is manufactured in this way.

Seventh, the sensor unit 10 is inserted into the bottom case 50, and the stoppers 60 and 70 are inserted in between the bottom case 50 and the sensor unit 10. Thus, the sensor unit 10 is fixed to the bottom case 50.

Eighth, the control substrate 20 and the relay substrate 30 are attached to the upper case 40.

Finally, the upper case 40 is attached to the bottom case 50.

The thermal flow meter 100 of the embodiment is manufactured by the foregoing processes.

A description will be given to the operation and effect of the thermal flow meter 100 of the embodiment described above.

In the thermal, flow meter 100 of the embodiment, the detection surface 12d of the sensor substrate 12 and the reinforcing plate 13 are bonded to the measurement tube 11 along the axis X with the adhesive such that the internal flow passage 10c of the measurement tube 11 is interposed between the sensor substrate 12 and the reinforcing plate 13. When using a thermosetting-resin-based adhesive as the adhesive, if the measurement tube 11 of resin is deflected as the thermal flow meter 100 is heated during manufacture, the heating resistance wire 12a and the temperature detecting resistance wires 12b and 12c of the sensor substrate 12 would not be at appropriate positions of the measurement tube 11, thereby degrading the measurement accuracy of the thermal flow meter 100.

Also, if the measurement tube 11 of resin is deflected as the thermal flow meter 100 is heated during use, the heating resistance wire 12a and the temperature detecting resistance wires 12b and 12c of the sensor substrate 12 would not be at the appropriate positions of the measurement tube 11, thereby degrading the measurement accuracy of the thermal flow meter 100.

According to the thermal flow meter 100 of the embodiment, because the sensor substrate 12 and the reinforcing plate 13 are arranged along the axis X with the internal flow passage 10c of the measurement cube 11 interposed therebetween, when they are heated, similar amount of thermal stresses occur at the part of the measurement tube 11 bonded to the sensor substrate 12 and that bonded to the reinforcing plate 13. This suppresses the bias in magnitude of the thermal stress that is caused to the measurement tube 11 by heat, among the both sides of the measurement tube 11 across the internal flow passage 10c. As a result, the configuration suppresses the deflection of the measurement tube 11 extending along the axis X, away from the axis X as compared with the case where only the sensor substrate 12 is bonded to the measurement tube 11.

As a result, there is provided the thermal flow meter 100 that can maintain the measurement accuracy even if heated during manufacture or use, while improving the corrosion resistance to alkaline liquids.

According to the thermal flow meter 100 of the embodiment, the sensor substrate 12 and the reinforcing plate 13 are bonded to the measurement tube 11 with the adhesive. When a sensor unit formed of a glass substrate having a heat transfer means and a temperature detecting means is bonded to a tubular flow passage of a resin material, a thermosetting adhesive is preferably used for maintaining the adhesiveness of the sensor unit with the flow passage even if subjected to high temperatures during use. The thermosetting adhesive, however, has the property of being solidified by heat, and thus, the sensor unit and the tubular flow passage need to be heated for being bonded to each other. If the tubular flow passage of resin is deflected during the heating process, the sensor unit cannot be bonded to the tubular flow passage appropriately.

According to the thermal flow meter 100 of the embodiment, when the measurement tube 11 is heated together with the sensor substrate 12 and the reinforcing plate 13 during manufacture for solidifying the thermosetting adhesive, similar amount of thermal stresses occur at the part of the measurement tube 11 bonded to the sensor substrate 12 and that bonded to the reinforcing plate 13. This suppresses the bias in magnitude of the thermal stress that is caused to the measurement tube 11 by heat, among the both sides of the measurement tube 11 across the internal flow passage 10c. As a result, the configuration suppresses the deflection of the measurement tube 11 extending along the axis X, away from the axis X as compared with the case where only the sensor substrate 12 is bonded to the measurement tube 11.

According to the thermal flow meter 100 of the embodiment, the measurement tube 11 has the flat surface 11c for the sensor substrate to which the sensor substrate 12 is bonded and the flat surface 11d for the reinforcing plate to which the reinforcing plate 13 is bonded, with the internal flow passage 10c of the measurement tube 11 interposed therebetween. This can enhance the adhesiveness of the sensor substrate 12 and the reinforcing plate 13 to the measurement tube 11 while reducing the amount of the adhesive required for the adhesion.

In the thermal flow meter 100 of the embodiment, the length L2 of the reinforcing plate 13 along the axis X is equal to or longer than the length L1 of the sensor substrate 12 along the axis X.

This more reliably suppresses the bias in magnitude of the thermal stress that is caused to the measurement tube 11 by heat, among the both sides of the measurement tube 11 across the internal flow passage 10c.

In the thermal flow meter 100 of the embodiment, the distance D1 from the detection surface 12d of the sensor substrate 12 to the inner circumferential surface 10d of the internal flow passage 10c is shorter than the distance D2 from the bonding surface 13a of the reinforcing plate 13 to the inner circumferential surface 10d of the internal flow passage 10c.

This can enhance the property of the heating resistance wire 12a to heat the liquid inside the internal flow passage 10c and the properties of the temperature detecting resistance wires 12b and 12c to detect the temperature of the liquid.

The sensor substrate 12 and the reinforcing plate 13 of the thermal flow meter 100 of the embodiment are made of glass.

Thus, the sensor substrate 12 and the reinforcing plate 13 are used that are made of glass to have higher strength and less probability of deformation by heat than the measurement tube 11 of resin. This suppresses the deflection of the measurement tube 11 caused when the sensor substrate 12 and the reinforcing plate 11 are bonded to the measurement tube 11 or during use.

According to the thermal flow meter 100 of the embodiment, the inlet 11a of the measurement tube 11 is inserted into the inlet-side body 16 and connected to the connection flow passage 16a formed inside the inlet-side body 16. Similarly, the outlet 11b of the measurement tube 11 is inserted into outlet-side body 17 and connected to the connection flow passage 17a formed inside the outlet-side body 17.

When the external threads 16b formed on the outer circumferential surface of the inlet-side body IS are fastened to the internal threads 15g formed on the inner circumferential surface of the inlet-side nut 15a, the tip portion 18a of the cylindrical inlet-side ferrule 18 that is fitted around the outer circumferential surface of the measurement tube 11 is deformed to form the seal area. Similarly, when the external threads 17b formed on the outer circumferential surface of the outlet-side body 17 are fastened to the internal threads 15h formed on the inner circumferential surface of the outlet-side nut 15b, the tip portion 19a of the cylindrical outlet-side ferrule 19 that is fitted around the outer circumferential surface of the measurement tube 11 is deformed to form the seal area.

The formation of the seal area on the inlet side of the measurement tube prevents the liquid from flowing out through the location of connection of the internal flow passage of the measurement tube with the first connection flow passage of the inlet-side body. Similarly, the formation of the seal area on the outlet side of the measurement tube prevents the liquid from flowing out through the location of connection of the internal flow passage of the measurement tube with the second connection flow passage of the outlet-side body.

According to the thermal flow meter 100 of the embodiment, the end portions of the sensor substrate 12 and the reinforcing plate 13 facing the inlet 10a are fixed, by the filler 15i, inside the recess 15e of the inlet-side nut 15a, and the end portions of the sensor substrate 12 and the reinforcing plate 13 facing the outlet 10b are fixed, by the filler 15j, inside the recess 15f of the outlet-side nut 15b. This can securely fix the sensor substrate 12 and the reinforcing plate 13 to the measurement tube 11 while fixing the measurement tube 11 to each of the inlet-side nut 15a and the outlet-side nut 15b.

According to the method of manufacturing the thermal flow meter 100 of the embodiment, the sensor substrate 12 and the reinforcing plate 13 are each arranged to be in contact with the measurement tube 11 along the axis X via the adhesive with the internal flow passage 10c of the measurement tube 11 interposed therebetween, and then the adhesive is solidified. Here, when using a thermosetting-resin-based adhesive as the adhesive, the thermosetting-resin-based adhesive is solidified by mounting the measurement tube 11 with the sensor substrate 12 and the reinforcing plate 13 bonded thereto to the jig (not shown) and heating them. In the process of heating the measurement tube 11, the sensor substrate 12, and the reinforcing plate 13, similar amount of thermal stresses occur at the part of the measurement tube 11 bonded to the sensor substrate 12 and that bonded to the reinforcing plate 13.

This suppresses the bias in magnitude of the thermal stress that is caused to the measurement tube 11 by heat, among the both sides of the measurement tube 11 across the internal flow passage 10c. As a result, the method suppresses the deflection of the measurement tube 11 extending along the axis X, away from the axis X as compared with the case where only the sensor substrate 12 is bonded to the measurement tube 11.

Thus, there is provided the method of manufacturing the thermal flow meter 100 that can maintain the measurement accuracy even if heated during manufacture or use, while improving the corrosion resistance to alkaline liquids.

Second Embodiment

Figure 9:
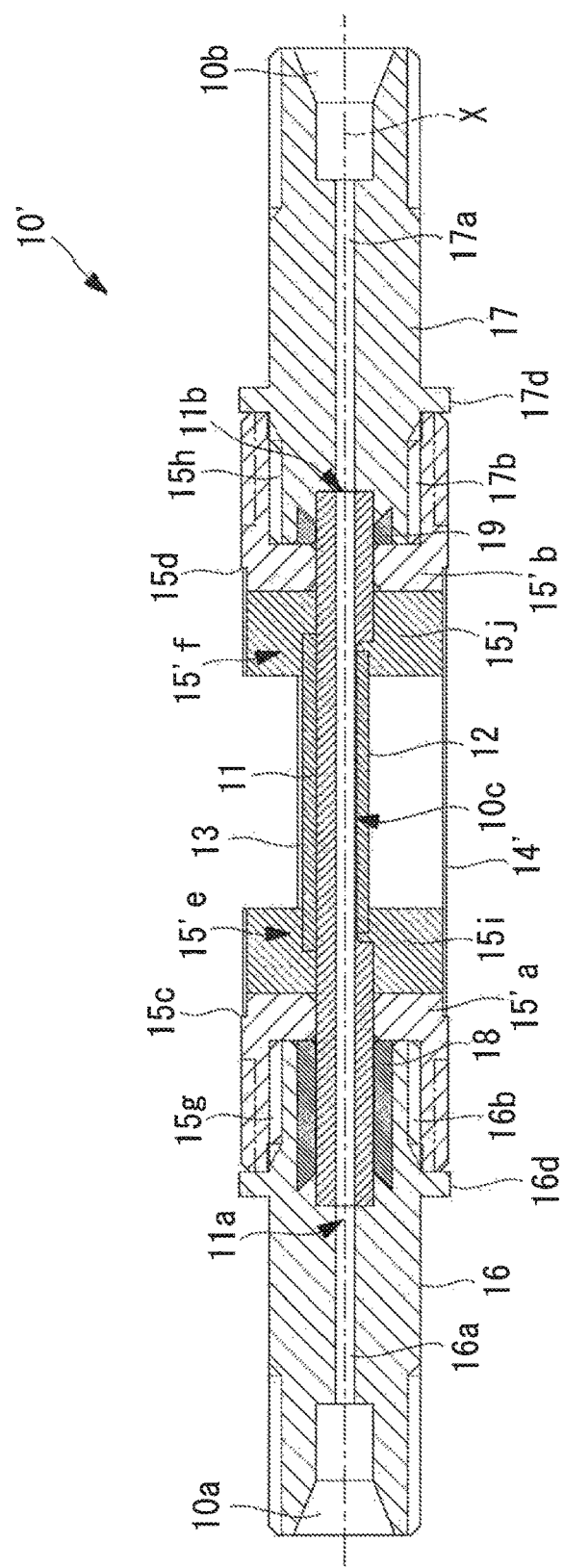
FIG. 9 is a vertical cross-sectional view of the sensor unit of the thermal flow meter according to a second embodiment.

Next, a thermal flow meter according to a second embodiment of the present disclosure will be described using FIGS. 9 and 10.

The second embodiment is a modification of the first embodiment, and is similar to the first embodiment unless otherwise described hereinafter.

In the sensor unit 10 of the thermal flow meter according to the first embodiment, the inlet-side nut 15a has the recess 15e that faces the outlet 10b, and the outlet-side nut 15b has the recess 15f that faces the inlet 10a.

On the other hand, in a sensor unit 10' of the thermal flow meter according to the embodiment, an inlet-side nut 15'a has a recess 15'e formed by a guide 14' that faces the outlet 10b, and an outlet-side nut 15'b has a recess 15'f formed by the guide 14' that faces the inlet 10a.

The guide 14' guides the inlet-side nut 15'a and the outlet-side nut 15'b such that the nuts are coupled together. As shown in FIG. 9, the inlet-side nut 15'a and the outlet-side nut 15'b are coupled together via the measurement tube 11. The measurement tube 11 and the inlet-side nut 15'a are fixed together by the filler 15*i* that is charged into the recess 15'*e* (the first recess). Also, the measurement tube 11 and the outlet-side nut 15'*b* are fixed together by the filler 15*j* that is charged into the recess 15'*f* (the second recess).

The guide 14' is a metal member (e.g., made of stainless steel) that has a circular cross section and is provided with an opening portion 14'*a* at its top.

Figure 10:
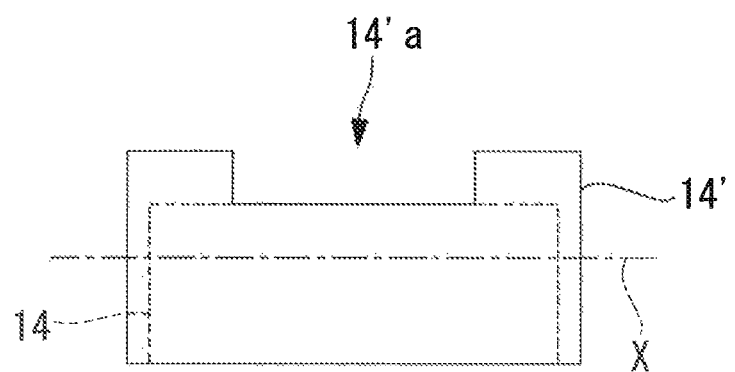
FIG. 10 is an elevational view of a guide shown in FIG. 9.

As snows in FIG. 10, the guide 14' does not open upwardly where it forms the recess 15'*e* and the recess 15'*f*, and has the opening portion 14'*a* only at the middle portion along the axis X.

It is to be noted that the shape of the guide 14 of the first embodiment is illustrated by a broken line in FIG. 10 for comparison.

According to the embodiment, the inlet-side nut 15'*a* and the outlet-side nut 15'*b* are not specially shaped to have a recess at the end portion, and the recess 15'*e* and the recess 15'*f* can be formed using the guide 14'.

Other Embodiments

The present invention is not limited to the above embodiment, and modifications may be made as appropriate without departing from the scope of the present invention.

The invention claimed is:

1. A thermal flow meter comprising:
a measurement tube made of resin including an inlet through which liquid enters and an outlet through which the liquid flowing from the inlet exits, and having an internal flow passage that extends along an axis and has a circular cross section from the inlet to the outlet;
a temperature detecting substrate having a heating resistance element and a temperature detecting resistance element formed on a detection surface thereof along the axis; and
a reinforcing place, wherein
the detection surface of the temperature detecting substrate is bonded with an adhesive to the measurement tube along the axis, and the reinforcing plate is bonded with the adhesive to the measurement tube along the axis with the internal flow passage interposed between the reinforcing plate and the temperature detecting substrate,
the measurement tube comprises an outer circumferential surface having a rectangular cross section comprising a first flat surface, the detection surface of the temperature detecting substrate is oppositely positioned relative to the first flat surface of the outer circumferential surface, and the rectangular cross section further comprises a second flat surface on which a face of the reinforcing plate is oppositely positioned with the internal flow passage interposed between the first flat surface and the second flat surface,
the first flat surface and the detection surface of the temperature detecting substrate are bonded together with the adhesive, and the second flat surface and the face of the reinforcing plate are bonded together with the adhesive;
the inlet of the measurement tube further comprises a circular cross section; and
the internal flow passage positioned at the rectangular cross section of the measurement tube is offset from a cross sectional center of the measurement tube.

2. The thermal flow meter according to claim 1, wherein a first length of the temperature detecting substrate along the axis is equal to or shorter than a second length of the reinforcing plate along the axis.

3. The thermal flow meter according to claim 1, wherein a first distance from the detection surface of the temperature detecting substrate to an inner circumferential surface of the internal flow passage is shorter than a second distance from the face of the reinforcing plate to the inner circumferential surface of the internal flow passage.

4. The thermal flow meter according to claim 1, wherein the temperature detecting substrate and the reinforcing plate are made of glass.

5. The thermal flow meter according to claim 1, further comprising:
an inlet-side body which has inside a first connection flew passage and into which the inlet of the measurement tube is inserted;
an outlet-side body which has inside a second connection flow passage and into which the outlet of the measurement tube is inserted;
a cylindrical inlet-side nut fitted along an outer circumferential surface of the measurement tube to be closer to the outlet than the inlet-side body, the inlet-side nut having an inner circumferential surface comprising internal threads, wherein the internal threads of the inlet-side nut are fastened to external threads formed on an outer circumferential surface of the inlet-side body;
a cylindrical outlet-side nut fitted along the outer circumferential surface of the measurement tube to be closer to the inlet than the outlet-side body, the outlet-side nut having an inner circumferential surface comprising internal threads, wherein the internal threads of the outlet-side nut are fastened to external threads formed on an outer circumferential surface of the outlet-side body;
an inlet-side ferrule of resin formed in a cylindrical shape and fitted between the outer circumferential surface of the measurement tube and an inner circumferential surface of an end portion of the inlet-side body facing the outlet, the inlet-side ferrule being deformed to form a seal area as the inlet-side nut is fastened to the inlet-side body; and
an outlet-side ferrule of resin formed in a cylindrical shape and fitted between the outer circumferential surface of the measurement tube and an inner circumferential surface of an end portion of the outlet-side body facing the inlet, the outlet-side ferrule being deformed to form a seal area as the outlet-side nut is fastened to the outlet-side body.

6. The thermal flow meter according to claim 5, wherein an end portion of the inlet-side nut facing the outlet is provided with a first recess info which each of an end portion of the temperature detecting substrate facing the inlet and an end portion of the reinforcing plate facing the inlet is inserted,
the end portion of the temperature detecting substrate facing the inlet and the end portion of the reinforcing plate facing the inlet are fixed to the inlet-side nut by a filler charged in the first recess,
an end portion of the outlet-side nut facing the inlet is provided with a second recess into which each of an end portion of the temperature detecting substrate facing the outlet and an end portion of the reinforcing plate facing the outlet is inserted, and
the end portion of the temperature detecting substrate facing the outlet and the end portion of the reinforcing plate facing the outlet are fixed to the outlet-side nut by a filler charged in the second recess.

7. The thermal flow meter according to claim 1, wherein the adhesive is a thermosetting adhesive.

8. The thermal flow meter of claim 1, wherein:
the outlet of the measurement tube comprises a circular cross section; and
the first flat face and the second flat face are positioned along the measurement tube between the inlet and the outlet.

9. The thermal flow meter of claim 1, wherein the internal flow passage does not encompass a cross sectional center of the measurement tube at the rectangular cross section.

10. A method of manufacturing a thermal flow meter including: a measurement tube made of resin including an inlet through which liquid enters and an outlet through which the liquid flowing from the inlet exits, and having an internal flow passage that extends along an axis and has a circular cross section from the inlet to the outlet; a temperature detecting substrate having a heating resistance element and a temperature detecting resistance element formed on a detection surface along the axis; and a reinforcing plate, the measurement tube comprises an outer circumferential surface having a rectangular cross section comprising a first flat surface, the detection surface of the temperature detecting substrate is oppositely positioned relative to the first flat surface of the outer circumferential surface, the rectangular cross section further comprises a second flat surface on which a face of the reinforcing plate is oppositely positioned with the internal flow passage interposed between the first flat surface and the second flat surface, and the internal flow passage positioned at the rectangular cross section of the measurement tube is offset from a cross sectional center of the measurement tube, the method, comprising the steps of:
arranging the temperature detecting substrate such that the detection surface comes into contact with the first flat surface of the measurement tube via a thermosetting adhesive along the axis;
arranging the reinforcing plate to come into contact with the second flat surface of the measurement tube via the thermosetting adhesive along the axis with the internal flow passage interposed between the temperature detecting substrate and the reinforcing plate;
and heating the measurement tube, the temperature detecting substrate, and the reinforcing plate to solidify the thermosetting adhesive.

11. The method of claim 10, wherein:
the outlet of the measurement tube comprises a circular cross section; and
the first flat face and the second flat face are positioned along the measurement tube between the inlet and the outlet.

12. The method of claim 10, wherein the internal flow passage does not encompass a cross sectional center of the measurement tube at the rectangular cross section.

* * * * *